(12) United States Patent
Kimura et al.

(10) Patent No.: US 9,224,413 B2
(45) Date of Patent: Dec. 29, 2015

(54) MAGNETIC RECORDING MEDIUM AND METHOD OF MANUFACTURING THE SAME

(71) Applicant: KABUSHIKI KAISHA TOSHIBA, Tokyo (JP)

(72) Inventors: Kaori Kimura, Yokohama (JP); Kazutaka Takizawa, Kawasaki (JP); Akira Watanabe, Kawasaki (JP); Takeshi Iwasaki, Inagi (JP); Akihiko Takeo, Kokubunji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 41 days.

(21) Appl. No.: 13/940,763

(22) Filed: Jul. 12, 2013

(65) Prior Publication Data

US 2014/0287265 A1 Sep. 25, 2014

(30) Foreign Application Priority Data

Mar. 22, 2013 (JP) .................................. 2013-061041

(51) Int. Cl.
*B44C 1/22* (2006.01)
*G11B 5/74* (2006.01)
*G11B 5/855* (2006.01)

(52) U.S. Cl.
CPC ................ *G11B 5/743* (2013.01); *G11B 5/855* (2013.01)

(58) Field of Classification Search
CPC .................................. G11B 5/743; G11B 5/855
USPC ................. 216/22, 41; 428/800; 427/127, 130
See application file for complete search history.

(56) References Cited

U.S. PATENT DOCUMENTS

| | | | |
|---|---|---|---|
| 6,602,620 B1 | 8/2003 | Kikitsu et al. | |
| 6,689,456 B2 | 2/2004 | Nakazawa et al. | |
| 2002/0136927 A1 | 9/2002 | Hieda et al. | |
| 2009/0162704 A1* | 6/2009 | Kimura et al. | 428/846 |
| 2009/0257148 A1 | 10/2009 | Ihara et al. | |
| 2009/0308837 A1* | 12/2009 | Albrecht et al. | 216/22 |
| 2011/0267718 A1* | 11/2011 | Itakura et al. | 360/135 |
| 2012/0067843 A1 | 3/2012 | Watanabe et al. | |
| 2012/0076747 A1 | 3/2012 | Bierganns et al. | |
| 2012/0107583 A1* | 5/2012 | Xiao et al. | 428/210 |
| 2014/0002929 A1 | 1/2014 | Takizawa et al. | |
| 2014/0120249 A1* | 5/2014 | Kimura et al. | 427/130 |

FOREIGN PATENT DOCUMENTS

| | | |
|---|---|---|
| JP | 2000-251236 A | 9/2000 |
| JP | 2001-134928 A | 5/2001 |

(Continued)

OTHER PUBLICATIONS

First Office Action mailed Jun. 23, 2015 in JP Application No. 2013-061041.

*Primary Examiner* — Duy Deo
*Assistant Examiner* — Christopher Remavege
(74) *Attorney, Agent, or Firm* — Knobbe Martens Olson & Bear LLP

(57) ABSTRACT

According to one embodiment, a magnetic recording medium including a substrate and a magnetic recording layer formed on the substrate and including a plurality of projections is obtained. The array of the plurality of projections includes a plurality of domains in which the projections are regularly arranged, and a boundary region between the domains, in which the projections are irregularly arranged. The boundary region is formed along a perpendicular bisector of a line connecting the barycenters of adjacent projections.

2 Claims, 8 Drawing Sheets

(56) References Cited

FOREIGN PATENT DOCUMENTS

| JP | 2001-319314 A | 11/2001 |
| JP | 2002-279616 A | 9/2002 |
| JP | 2004-303302 A | 10/2004 |
| JP | 2005-122820 A | 5/2005 |
| JP | 2007-133940 A | 5/2007 |
| JP | 2009-252319 A | 10/2009 |
| JP | 2011-233210 A | 11/2011 |
| JP | 2012-064783 A | 3/2012 |
| JP | 2012-074127 A | 4/2012 |
| JP | 5035678 B | 9/2012 |
| JP | 2014-010870 A | 1/2014 |

* cited by examiner

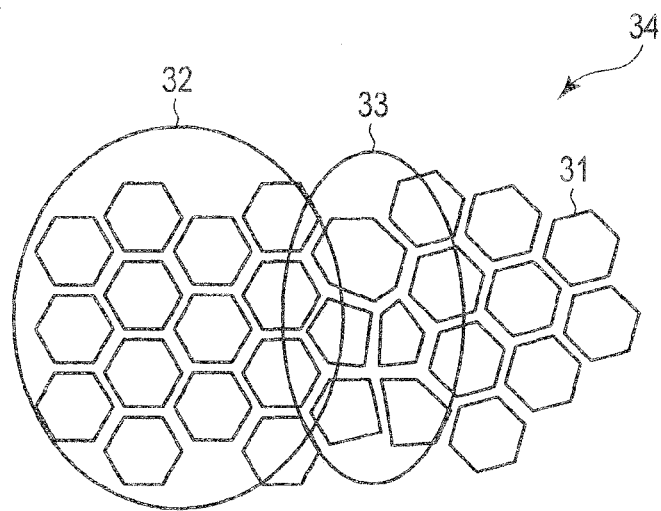
F I G. 1
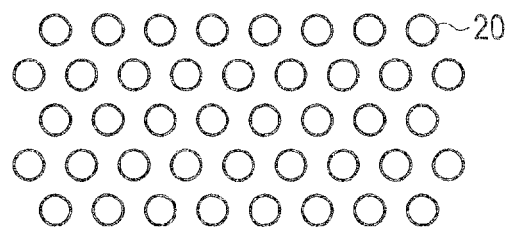
F I G. 2
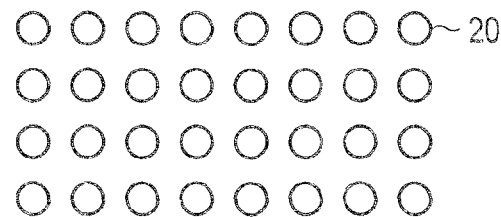
F I G. 3

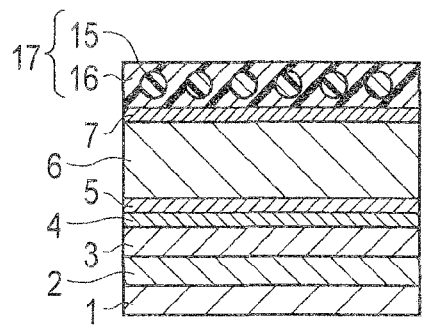
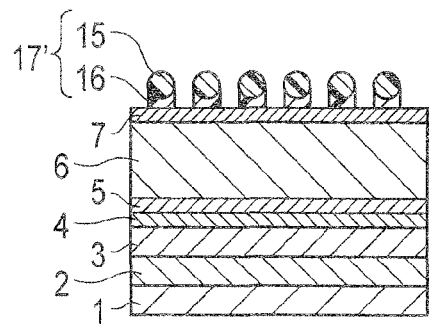
F I G. 4A    F I G. 4B
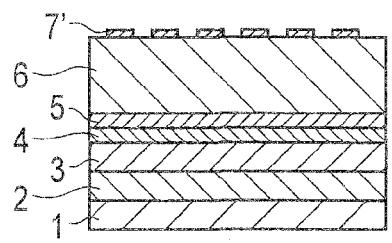
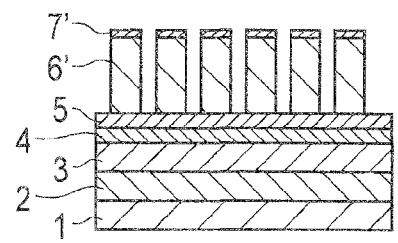
F I G. 4C    F I G. 4D
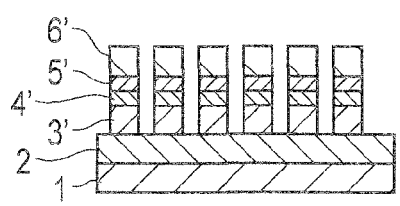
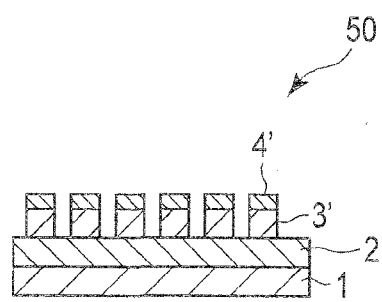
F I G. 4E    F I G. 4F

MAGNETIC RECORDING MEDIUM AND METHOD OF MANUFACTURING THE SAME

CROSS-REFERENCE TO RELATED APPLICATIONS

This application is based upon and claims the benefit of priority from Japanese Patent Application No. 2013-061041, filed Mar. 22, 2013, the entire contents of which are incorporated herein by reference.

FIELD

Embodiments described herein relate generally to a magnetic recording medium and a method of manufacturing the same.

BACKGROUND

Micropatterns on surfaces are processed into three-dimensional structures in the technical fields of, e.g., hard disk media, antireflection films, catalysts, microchips, and optical devices.

As the recording densities of magnetic recording apparatuses increase, patterned medium such as BPM (Bit Patterned Media) have been proposed as magnetic recording media for achieving high recording densities. A patterned medium can be obtained by processing the surface of a recording layer of a hard disk medium into a three-dimensional microstructure. Several methods can be used to process the surface into a three-dimensional microstructure. Examples are drawing methods using an electron beam and UV light, and a method using a self-organization phenomenon of a polymer or the like.

For example, a patterned medium manufactured by using a self-organizing process is expected to have "domains" in which magnetic dots are closely arranged. The domains have various sizes from a few ten nm to a few hundred μm. Regardless of the domain size, however, disturbance occurs in a dot array in a domain boundary. This disturbance of the array reduces a partial magnetic volume, and presumably causes noise when reading a magnetic signal by a head.

BRIEF DESCRIPTION OF THE DRAWINGS

FIG. 1 is a plan view showing an example of the array of projections used in an embodiment;

FIG. 2 is a view showing an example of the array of dot patterns of a self-organization film;

FIG. 3 is a view showing an example of the array of dot patterns of a self-organization film;

FIGS. 4A, 4B, 4C, 4D, 4E, and 4F are views showing an example of a magnetic recording medium manufacturing method according to the embodiment;

DETAILED DESCRIPTION

Figures 5A, 5B:
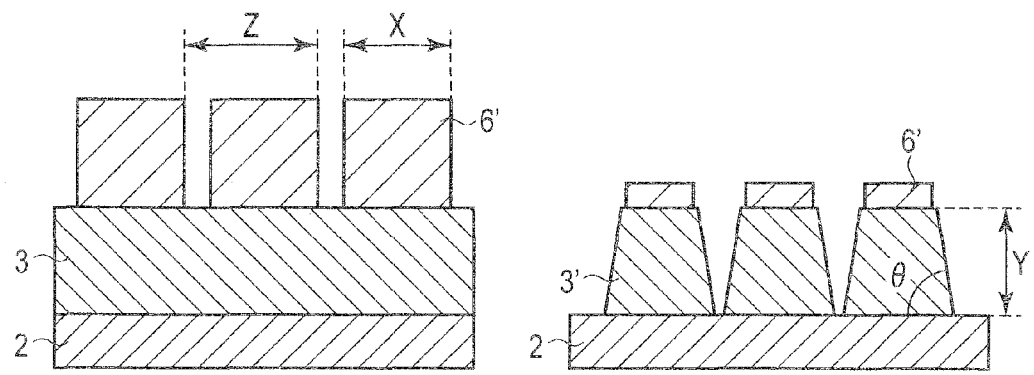
FIGS. 5A and 5B are views for explaining conditions used in the embodiment.

In general, according to one embodiment, a magnetic recording medium according to the first embodiment includes a substrate, and a magnetic recording layer formed on the substrate and including a plurality of projections. The array of the plurality of projections can have a plurality of domains in which the projections are regularly arranged, and a boundary region between the domains, in which the projections are irregularly arranged. The boundary region between the domains is formed along a perpendicular bisector of a line connecting the barycenters of adjacent projections.

In the embodiment, the boundary region between the domains is formed along a perpendicular bisector of a line connecting the barycenters of adjacent projections. Therefore, the projections exist with no space between them even in the domain boundary in which they are irregularly arranged. This raises the magnetic signal intensity of the magnetic recording medium. Consequently, a magnetic recording medium having little noise can be provided.

A magnetic recording medium manufacturing method according to the second embodiment is an example of a method of manufacturing the magnetic recording medium according to the abovementioned first embodiment, and includes forming a magnetic recording layer on a substrate,
forming a mask layer on the magnetic recording layer,
forming projecting patterns on the mask layer,
transferring the projecting patterns to the mask layer,
etching the magnetic recording layer through the mask layer having the projecting patterns, and
removing the mask layer,
wherein letting X nm be the diameter of the projecting patterns of the mask layer before the magnetic recording layer is processed, Y nm be the etching depth of the magnetic recording layer, Z nm be the dot pitch of the projecting patterns of the mask layer, and θ degrees be the taper angle of the side surface of a projection with respect to its bottom surface, expression (1) below holds:

$$X > Z - 2Y/\tan\theta \tag{1}$$

In the magnetic recording medium manufacturing method according to the second embodiment, a plurality of projections can be arranged, by patterning the magnetic recording layer, so as to form a plurality of domains in which the projections are regularly arranged, and a boundary region between the domains, in which the projections are irregularly arranged. In addition, the boundary between projections adjacent to each other can be formed along a perpendicular bisector of a line connecting the centers of the adjacent projections. This raises the magnetic signal intensity of the magnetic recording medium. It is also possible to provide a magnetic recording medium having little noise by decreasing the reduction in magnetic volume. Furthermore, projections having a structure that fills the domain boundary by self-healing can be formed by satisfying expression (1).

The projection can have a shape obtained by combining a circular truncated conical shape as a vertex region, and a truncated polygonal conical shape as a bottom region. Since this shape allows the projections to exist in the medium with no space between them, the magnetic signal intensity rises. It is also possible to suppress the reduction in partial magnetic volume that causes noise when reading a magnetic signal by using a head.

The projection in the domain can have a truncated pyramidal shape or truncated hexagonal conical shape as the truncated polygonal conical shape of the bottom region. When compared to the domain boundary, therefore, the projections are closely packed with no space between them in the domain. This makes it possible to increase the magnetic volume, and maintain the thermal stability of grains.

It is also possible to stack separated magnetic layers having magnetic anisotropy lower than that of the projections, between the substrate and the plurality of projections, or on the plurality of projections. The coercive force of the magnetic recording layer can be reduced by using these magnetic layers.

A continuous magnetic layer can further be formed as a cap layer between the substrate and the plurality of projections, or on the plurality of projections. As a consequence, magnetic recording medium having small coercive force dispersion is obtained.

The step of forming the projecting patterns on the mask layer can be performed by forming a layer in which patterns are arranged by self-organization on the mask layer, leaving a dot-shaped phase behind, and removing the other phase. It is also possible to obtain desired patterns by using a method such as electron beam (EB) lithography. Furthermore, patterns formed by self-organization or EB can be duplicated by imprinting, or self-organization materials can be arranged after guides are formed by EB.

The embodiment will be explained below with reference to the accompanying drawings.

FIG. 1 is a plan view showing an example of the array of projections used in the embodiment.

As shown in FIG. 1, a magnetic recording layer 34 of this magnetic recording medium includes a plurality of projections 31. The crystal structure of the projections 31 is oriented perpendicularly to a substrate, and has a magnetization state perpendicular to the substrate. The projections 31 have a diameter of a few ten nm to a few nm. The array of the projections 31 forms domains 32 each having a wide area of a few ten nm to a few hundred gm or more. In one domain 32, dots are regularly arranged. On the other hand, dots are irregularly arranged in a boundary region 33 between the domains 32.

FIGS. 2 and 3 are views showing examples of the array of dot patterns of a self-organization film for forming the projections 31.

Dot patterns 20 in the domain 32 have a symmetric regular array such as a hexagonal close-packed array shown in FIG. 2 or a tetragonal array shown in FIG. 3. As shown in FIG. 1, the boundary between the projections is formed along a perpendicular bisector of a line connecting the barycenters of adjacent projections.

Magnetic layers having a continuous structure can be formed above or below the projections. These magnetic layers can achieve an effect of, e.g., increasing the exchange coupling between magnetic grains and decreasing the dispersion of the coercive force (Hc). Alternatively, it is possible to give a function of decreasing a switching magnetic field to magnetic grains having a high coercive force.

EXAMPLES

Example 1

An example of the magnetic recording medium manufacturing method according to the embodiment will be explained with reference to FIGS. 4A, 4B, 4C, 4D, 4E, 4F, 5A, and 5B.

As shown in FIG. 4A, a 40-nm thick soft magnetic layer (not shown) made of, e.g., CoZrNb, a 20-nm thick orientation control interlayer 2 made of, e.g., Ru, a 10-nm thick magnetic recording layer 3 made of, e.g., $Co_{80}Pt_{20}$, a 2-nm thick protective film 4 made of, e.g., Pd, a 5-nm thick liftoff layer 5 made of, e.g., Mo, a 20-nm thick first hard mask layer 6 made of, e.g., C, and a 3-nm thick second hard mask layer 7 made of, e.g., Si are deposited on a glass substrate 1. The second hard mask layer 7 is hydrophobized by coating it with a polystyrene (PS) brush layer. The hydrophobized second hard mask layer 7 is spin-coated with PS-PDMS (Polystyrene-Polydimethylsiloxane) as a self-organization material, thereby forming a self-organization material layer 17. When phase separation is caused in the self-organization material by performing annealing at 150° C. for 10 hrs, PDMS spheres 15 float in a PS sea 16. When this medium is observed with a planar SEM, patterns in which PS dots form a hexagonal close-packed array are found.

As shown in FIG. 4B, PDMS is isolated by removing the PS phase around the PDMS spheres 15 by dry etching. For example, this step is performed for an etching time of 60 sec by an inductively coupled plasma (ICP)-RIE apparatus by using $O_2$ gas as a process gas at a chamber pressure of 0.1 Pa, a coil RF power of 100 W, and a platen RF power of 10 W. In this step, the PS sea 16 is etched, and the PDMS spheres 15 are isolated, thereby forming projecting patterns 17'.

Subsequently, as shown in FIG. 4C, the patterns 17' of the PDMS spheres 15 are transferred to the second hard mask layer (Si) 7. This step is performed for an etching time of 30 sec by the ICP-RIE apparatus by using $CF_4$ gas as a process gas at a chamber pressure of 0.1 Pa, a coil RF power of 200 W, and a platen RF power of 20 W. In this step, Si is removed from recesses between the PDMS spheres 15, second hard mask layer projecting patterns 7' are formed, and the underlying first hard mask layer (C) 6 is exposed.

As shown in FIG. 4D, the shape of the inverted layer is transferred to the first hard mask (C) 6 by using the second hard mask projecting patterns 7' as masks. This step is performed for an etching time of 60 sec by the ICP-RIE apparatus by using $O_2$ gas as a process gas at a chamber pressure of 0.1 Pa, a coil RF power of 50 W, and a platen RF power of 5 W. In this step, C is removed from recesses between the projecting patterns 7', and first hard mask layer projecting patterns 6' are formed.

FIG. 5A is a schematic view showing a diameter X and dot pitch Z of the mask layer projecting patterns.

FIG. 5B is a schematic view showing a processing depth Y of projections of the magnetic recording layer.

Figure 6:
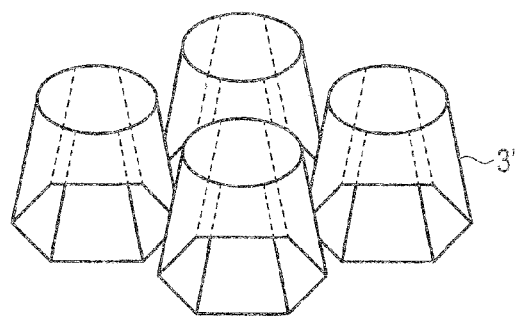
FIG. 6 is a schematic view showing projections used in the embodiment.

FIG. 6 is a schematic perspective view showing the shape of the projections of the magnetic recording layer.

Note that these schematic views do not show any of the substrate 1, projective layer 4, and liftoff layer 5 for the sake of simplicity.

The magnetic recording layer and the mask layer projecting patterns formed on it are so adjusted as to change the shape shown in FIG. 5A into the shape shown in FIG. 5B.

More specifically, this adjustment is performed so that the diameter X of the projecting patterns 6' of the first hard mask (C) as a mask layer, the processing depth Y of the magnetic recording layer, the dot pitch Z of the projecting patterns 6' of the first hard mask (C), and the taper angle θ of the magnetic dots after the recording layer is processed satisfy:

$$X > Z - 2Y/\tan \theta \quad (1)$$

In Example 1, processing was advanced under conditions by which the diameter X of the mask layer projecting patterns 6'=15 nm, the dot pitch Z of the mask layer projecting patterns 6'=20 nm, the processing depth Y of the magnetic recording layer=15 nm, and θ=80°. When the projecting pattern masks 6' shown in FIG. 5A are formed under the conditions, projections 3' having the tapered shape as shown in FIG. 5B can be formed during the processing. Consequently, as shown in FIG. 6, it is possible to form a magnetic recording layer including a plurality of projections 3' each having a shape obtained by combining a circular truncated conical shape as a vertex region, and a truncated polygonal conical shape as a bottom region.

As shown in FIG. 4E, the projecting patterns 6' of the first hard mask layer are transferred to the liftoff layer 5, protective layer 4, and magnetic recording layer 3 by ion milling, thereby forming liftoff layer projecting patterns 5', protective layer projecting patterns 4', and magnetic recording layer projecting patterns 3'. For example, this step is performed for an etching time of 20 sec by an Ar ion milling apparatus by using Ar as a process gas at a chamber pressure of 0.04 Pa, a plasma power of 400 W, and an acceleration voltage of 400 V.

As shown in FIG. 4F, the first hard masks 6' are removed together with the Mo liftoff layers 5'. For example, this step is performed by dipping the medium into a 0.1% hydrogen peroxide solution, and holding the medium in it for 5 min.

Finally, a second protective film (not shown) is formed by CVD (Chemical Vapor Deposition) and coated with a lubricant, thereby obtaining a magnetic recording medium 50 according to the embodiment.

Figure 7:
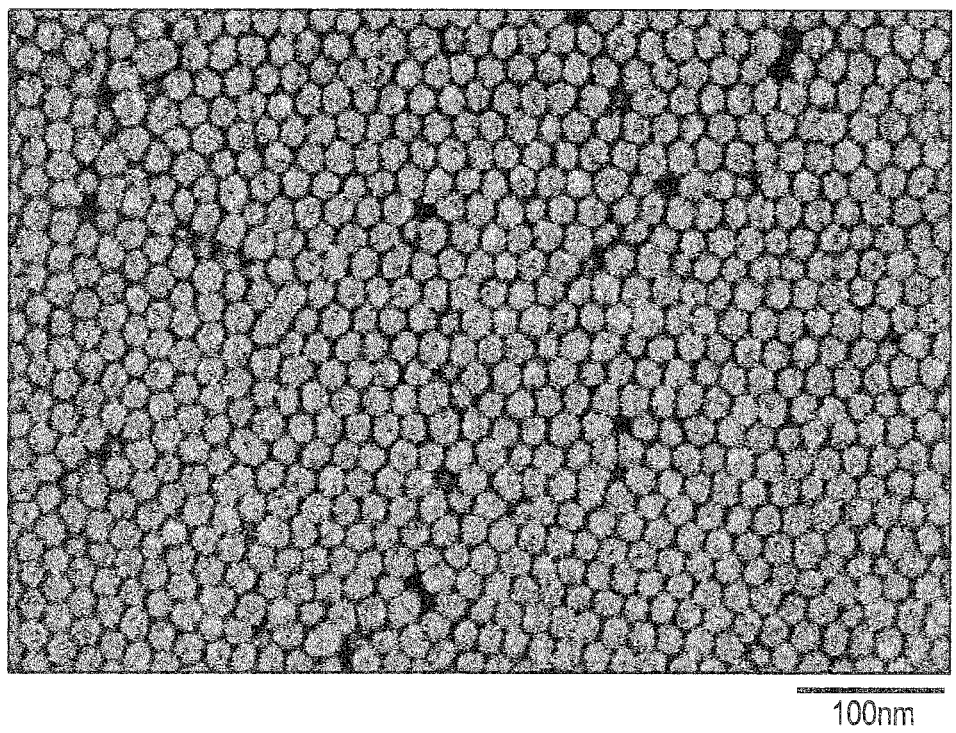
FIG. 7 is a planar SEM photograph of a magnetic recording medium according to the embodiment.

FIG. 7 is a planar SEM photograph showing the magnetic recording medium 50 shown in FIG. 4F from above.

When the planar structure of the magnetic recording medium manufactured by the method as described above was observed with an SEM, the magnetic recording medium obtained by Example 2 included domains in which projections formed from a hexagonal close-packed array, and a boundary region between the domains, as shown in FIG. 7.

Comparative Example 1

A patterned medium was manufactured in the same manner as in Example 1. However, the medium was manufactured by changing the conditions as follows.

A magnetic recording medium was manufactured following the same procedures as in Example 1 except that the mask diameter X shown in FIG. 4D was changed to 10 nm.

In this case, $X < Z - 2Y/\tan \theta$ holds, i.e., expression (1) is not satisfied. After processing, the bottom region shape of the projection in the domain boundary was not a polygon as shown in FIG. 1 but a dot shape reflecting the projecting pattern of the mask.

Comparative Example 2

The ion milling step shown in FIG. 4E was changed to RIE using $Cl_2$ gas.

The antenna power, bias power, and process gas pressure were respectively set at 100 W, 100 W, and 0.6 Pa.

In this case, the dot shape was an inverted taper, i.e., was not a shape obtained by combining a circular truncated conical shape as a vertex region and a truncated polygonal conical shape as a bottom region, because corrosive $Cl_2$ gas was used. Consequently, θ=95°. Since tan θ takes a negative value, $X < Z - 2Y/\tan \theta$ holds, i.e., expression (1) is not satisfied.

The magnetic recording media obtained by Example 1 and Comparative Examples 1 and 2 were incorporated into a drive, and the signal intensities were compared. Table 1 below shows the obtained results.

TABLE 1

|  | Signal (V) in domain | Signal (V) in domain boundary | Signal fall (%) in domain boundary |
|---|---|---|---|
| Example 1 | 0.11 | 0.10 | 9 |
| Comparative Example 1 | 0.06 | 0.03 | 50 |
| Comparative Example 2 | 0.10 | 0.06 | 40 |

The signal amplitudes (Signal) in the domain and domain boundary took values as shown in Table 1. These results reveal that a high signal intensity can be obtained even in the domain boundary in the magnetic recording medium according to the embodiment.

Example 2

Another example of the magnetic recording medium manufacturing method according to the embodiment will be explained with reference to FIGS. 13A, 13B, 13C, 13D, 13E, 13F, and 13G.

Figure 13A:
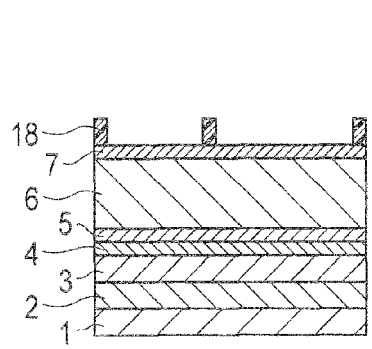
FIGS. 13A, 13B, 13C, 13D, 13E, 13F, and 13G are views showing another example of the magnetic recording medium manufacturing method according to the embodiment.

As shown in FIG. 13A, a 40-nm thick soft magnetic layer (CoZrNb) (not shown), a 50-nm thick orientation control interlayer 2 (MgO), a 5-nm thick magnetic recording layer 3 ($Fe_{50}Pt_{50}$ having an $L1_0$ structure), a 2-nm thick protective film 4 (Pt), a 5-nm thick liftoff layer 5 (W), a 20-nm thick first hard mask layer 6 (C), and a 3-nm thick second hard mask layer 7 (Si) are deposited on a glass substrate 1. In addition, patterns of guides 18 for arranging a self-organization material are formed by imprinting. For example, this step is performed by evenly coating the substrate with a 30-nm thick photosetting resist, pressing a light-transmitting resin stamper against the resist, radiating UV light, and releasing the stamper. The resist residue is removed by dry etching, and the Si surface is exposed. For example, this step is performed for an etching time of 10 sec by an inductively coupled plasma (ICP) RIE apparatus by using $O_2$ gas as a process gas at a chamber pressure of 0.1 Pa, a coil RF power of 100 W, and a platen RF power of 10 W. The remaining guides 18 had a height of 10 nm and a width of 3 to 5 nm.

Figure 13B:
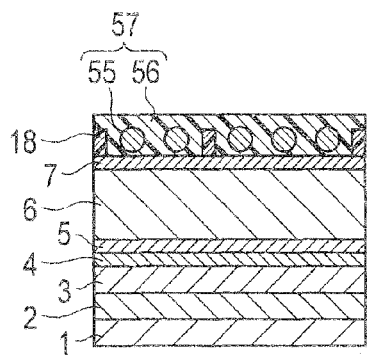

Then, as shown in FIG. 13B, the second hard mask layer 7 (Si) is coated with a self-organization material, thereby forming a self-organization material coating layer 57. For example, this step is performed by mixing silica grains 55 having a diameter of 25 nm and ETPTA (Ethoxylated Trimethylolpropane Triacrylate) 56 in a PGMEA (Propyleneglycol Monomethyl Ether Acetate) solvent such that the concentration of the silica grains 55 is 5 wt %, and spin-coating the second hard mask layer 7 with the solution as a monolayer of the silica grains. The applied silica grains 55 were arranged by self-organization along the guide patterns 18 of the resist. Also, portions around the silica grains 55 were filled with the ETPTA. In addition, since no silica existed where the guide patterns were originally formed, the grain spacing widened by about 3 nm from that in a close-packed portion.

Figure 13C:
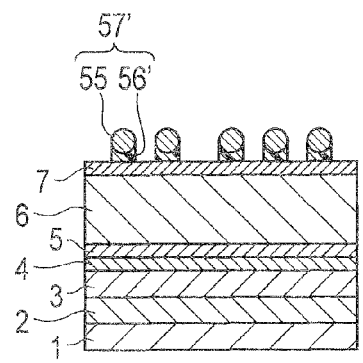

As shown in FIG. 13C, the ETPTA 56 existing around the silicon grains 55 was removed by dry etching, thereby forming projecting patterns 57 including the silica grains 55, and ETPTA 56' remaining between the second hard mask layer 7 and silicon grains 55. For example, this step is performed for an etching time of 10 sec by the ICP-RIE apparatus by using $O_2$ gas as a process gas at a chamber pressure of 0.1 Pa, a coil RF power of 100 W, and a platen RF power of 10 W.

Figure 13D:
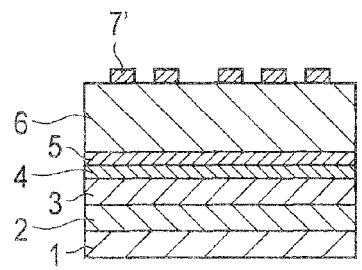

As shown in FIG. 13D, the projecting patterns 57 are transferred to the Si mask 7 by dry etching. For example, this step is performed for an etching time of 30 sec by the ICP-RIE apparatus by using $CF_4$ gas as a process gas at a chamber pressure of 0.1 Pa, a coil RF power of 200 W, and a platen RF power of 20 W. In this step, the dot size is properly decreased by simultaneously etching the silica grains 55 and Si layer 7, and the dot patterns are transferred to the Si layer 7, thereby forming projecting patterns 7'.

Figure 13E:
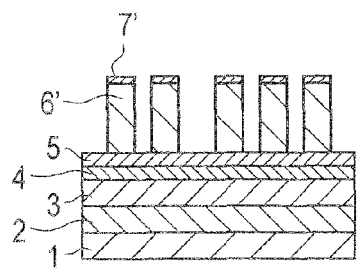

As shown in FIG. 13E, the first hard mask (C) 6 is etched by using the second hard mask (Si) projecting patterns 7' as masks, thereby forming first hard mask projecting patterns 6'. This etching of the first hard mask (C) 6 is performed for an etching time of 60 sec by the ICP-RIE apparatus by using $O_2$ gas as a process gas at a chamber pressure of 0.1 Pa, a coil RF power of 50 W, and a platen RF power of 5 W.

In this step, the formed masks are adjusted by the process so as to form the structures as shown in FIGS. 5A and 5B. That is, the adjustment is performed such that $X > Z - 2Y/\tan\theta$ holds for the processing mask diameter X, the processing depth Y, the dot pitch Z, and the taper $\theta$ of the processed magnetic dots. In this example, processing was advanced under conditions by which the processing mask diameter X=19 nm, the processing depth Y=10 nm, and $\theta$=70°. When a processing mask having this shape is formed, the magnetic recording layer is tapered during processing, and the structure as shown in FIG. 6 can be formed.

Figure 13F:
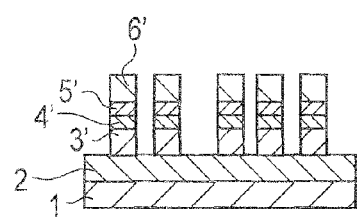

As shown in FIG. 13F, the shape of the first hard mask (C) projecting patterns 6' is transferred to the magnetic recording layer 3, thereby forming projections 3', protective layer projecting patterns 4', and liftoff layer projecting patterns 5'. For example, ion milling is performed for an etching time of 10 sec by an Ar ion milling apparatus by using Ar as a process gas at a chamber pressure of 0.04 Pa, a plasma power of 400 W, and an acceleration voltage of 400 V.

Figure 13G:
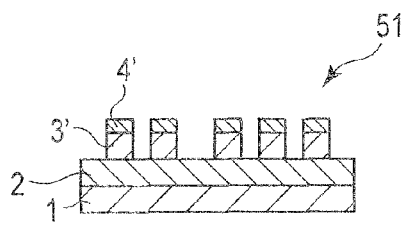

As shown in FIG. 13G, the first hard mask (C) projecting patterns 6' are removed together with the W liftoff layer projecting patterns 5'. For example, this step is performed by dipping the medium into a 0.1% hydrogen peroxide solution, and holding the medium in it for 5 min.

Finally, a second protective film (not shown) is formed by CVD (Chemical Vapor Deposition) and coated with a lubricant, thereby obtaining a patterned medium 51 according to the embodiment.

When the planar structure of the patterned medium manufactured by the method as described above was observed with an SEM, the medium had a structure in which domain boundaries existed where the guides were originally formed.

Example 3

A patterned medium was manufactured following the same procedures as in Example 1.

In Example 3, however, the arrangement of the magnetic recording layer was made suitable for (1) an ECC structure and (2) a capped structure.

In Example 3-1, a magnetic recording medium was obtained in the same manner as in Example 1 except that a multilayered film including a 6-nm thick $Co_{80}Pt_{20}$ layer, 1.5-nm thick Ru layer, and 2.5-nm thick CoCrPt alloy layer was used instead of 10-nm thick $Co_{80}Pt_{20}$, and the shape of first hard mask (C) projecting patterns was transferred to the three layers, i.e., the $Co_{80}Pt_{20}$ layer, Ru layer, and CoCrPt alloy layer.

In the magnetic recording layer of the obtained magnetic recording medium, all the three layers were divided. The magnetic anisotropy of the $Co_{80}Pt_{20}$ layer was $1\times10^7$ erg/cc, and that of the CoCrPt alloy layer was $5\times10^6$ erg/cc.

In Example 3-2, a magnetic recording medium was obtained in the same manner as in Example 1 except that a 10-nm thick $Co_{80}Pt_{20}$ layer was stacked on a 3-nm thick $CoCrPt-SiO_2$ layer, and the shape of first hard mask (C) projecting patterns was transferred to the $Co_{80}Pt_{20}$ layer. In the magnetic recording layer of the obtained magnetic recording medium, the $CoCrPt-SiO_2$ layer continued, and the $Co_{80}Pt_{20}$ layer was divided.

The coercive force Hc and SFD (switching Field Distribution) of each of the obtained magnetic recording media were measured.

Table 2 below shows the obtained results.

TABLE 2

| | Layer arrangement | Hc (kOe) | SFD (%) |
|---|---|---|---|
| Example 1 | $Co_{80}Pt_{20}$(10 nm) | 7 | 10 |
| Example 3-1 | $Co_{80}Pt_{20}$(6 nm)/Ru(1.5 nm)/CoCrPt(3.5 nm) | 5 | 10 |
| Example 3-2 | $CoCrPt-SiO_2$(3 nm)/$Co_{80}Pt_{20}$(7 nm) | 6 | 7 |

It was possible to obtain the effect of reducing the coercive force Hc by the arrangement of Example 3-1, and the effect of reducing the SFD by the arrangement of Example 3-2.

The steps, materials, and the like used in the embodiment will be explained in more detail below.

<Mask Layer Projecting Patterns>

The mask layer projecting patterns used in the embodiment have the following features.

When using the projecting patterns as a patterned medium, a processed magnetic dot can be a single magnetic domain. Whether the magnetic dot becomes a single magnetic domain depends on parameters such as the perpendicular magnetic anisotropy Ku, magnetization Ms, and film thickness t of the magnetic material. However, the diameter of the magnetic dot can be 100 nm or less, and further more, 50 nm or less, as the diameter of a circle. The distance (pitch) between the barycenters of dots can be the twice or less the dot diameter, in order to sufficiently increase the S/N during signal reproduction.

In the process according to the embodiment, expression (1) below desirably holds for the diameter X of the mask layer projecting patterns 6', the processing depth Y of the magnetic recording medium, the dot pitch Z of the mask layer projecting patterns 6', and the taper $\theta$ of the processed projections 3' shown in FIGS. 5A and 5B:

$$X > Z - 2Y/\tan\theta \qquad (1)$$

This is so because if the diameter X of the mask layer projecting patterns 6' is not sufficiently large, it is impossible to sufficiently utilize the self-healing function in the domain boundary during processing.

The mechanism by which the domain boundary increases the magnetic volume by self-healing will be explained with reference to FIGS. 8A, 8B, 8C, 9A, 9B, and 9C.

Figure 8A:
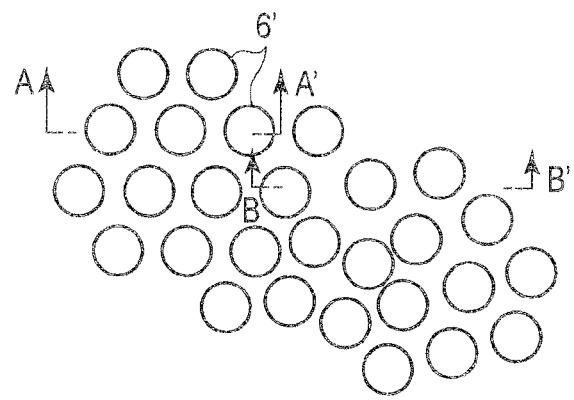
FIGS. 8A, 8B, and 8C are schematic views showing examples of the section of the projection used in the embodiment.

FIG. 8A is a schematic front view showing dot patterns of projections when the vertex region of the magnetic recording layer is processed.

Figure 8B:
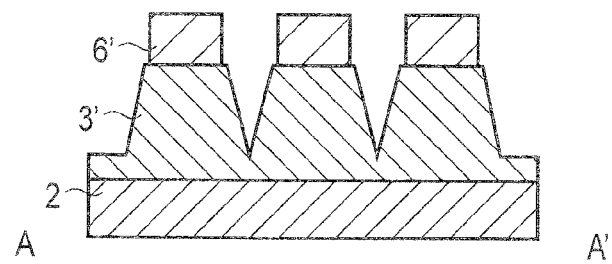

FIG. 8B is an A-A' longitudinal sectional view of FIG. 8A.

Figure 8C:
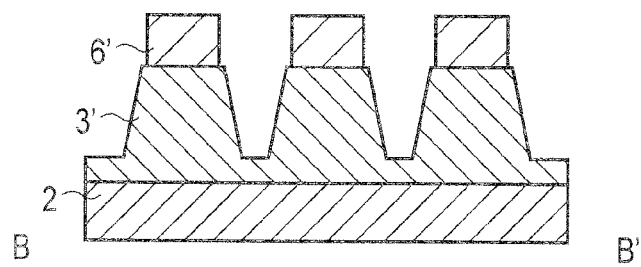

FIG. 8C is a B-B' longitudinal sectional view of FIG. 8A.

Figure 9A:
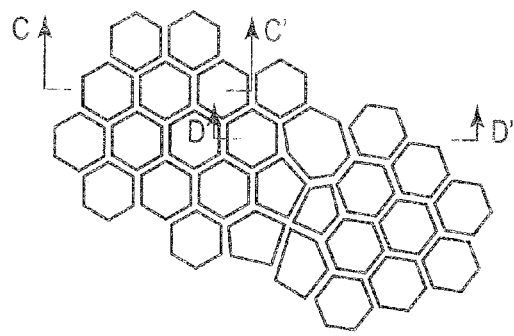
FIGS. 9A, 9B, and 9C are schematic views showing other examples of the section of the projection used in the embodiment.

FIG. 9A is a schematic front view showing dot patterns of projections when the bottom region of the magnetic recording layer is processed.

Figure 9B:
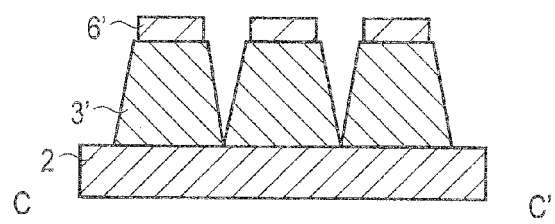

FIG. 9B is a C-C' longitudinal sectional view of FIG. 9A.

Figure 9C:
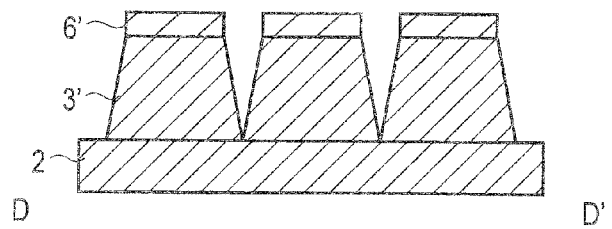

FIG. 9C is a D-D' longitudinal sectional view of FIG. 9A.

In the A-A' section of the domain shown in FIG. 8A, the spaces between the dots of the mask layer projecting patterns 6' are narrow to some extent.

Likewise, in the C-C' section of the domain shown in FIG. 9A, the spaces between the dots of the mask layer projecting patterns 6' are narrow to some extent.

When the spaces between the dots of the mask projecting patterns 6' are narrow to some extent as shown in the A-A' longitudinal sectional view of FIG. 8B and the C-C' longitudinal sectional view of FIG. 9B, the grooves between the projections 3 gradually narrow due to the taper of the projections 3' of the magnetic recording layer, and are finally V-shaped, as shown in FIGS. 8B and 9B. When etching is performed by a small depth of about a few nm after the V-shaped grooves are formed, the shape remains unchanged, and only the depth changes.

On the other hand, in the domain boundary of the mask layer projecting patterns 6', the spaces are initially wide because the dot pitch is wide.

In the B-B' section in the domain boundary region shown in FIG. 8A, the spaces between the dots of the mask layer projecting patterns 6' are wide to some extent.

In the D-D' section in the domain boundary region shown in FIG. 9A, the spaces between the dots of the mask layer projecting patterns 6' are wide to some extent.

When the spaces between the dots of the mask projecting patterns 6' are wide to some extent as shown in the B-B' longitudinal sectional view of FIG. 8C and the D-D' longitudinal sectional view of FIG. 9C, there is a flat portion between the tapers of adjacent projections 3' of the magnetic recording layer as shown. The flat portion is finally V-shaped when etching is further advanced.

As described above, the dot spaces narrow at the end of processing of the magnetic recording layer. When this state is viewed from above by using, e.g., an SEM, as shown in FIG. 9A, the dots swell to fill the spaces, and the magnetic density of the recording layer apparently increases from that of the mask stage.

When the taper is close to 90°, i.e., perpendicular to the film surfaces after processing, tan θ takes a large value, and X approaches Z. The processing taper of ion milling used in the embodiment can be 60° to 88°. Tan θ can be 1.73 to 28.6. The processing depth Y largely depends on the thickness of the recording layer, and is larger than the thickness of the recording layer when the recording layer is completely divided. Also, the processing depth Y is smaller than the thickness of the magnetic recording layer when the layer has a multilayered structure and the structure is a capped structure in which the lowermost layer is left behind. Although the processing depth Y changes in accordance with the design of the recording layer, the processing depth Y falls within the range of 30 nm>Y>2 nm. By using these conditions of Y, θ, and Z, the mask diameter X before the magnetic material is processed can be determined so as to satisfy X>Z−2Y/tan θ.

<Shapes of Projections of Magnetic Recording Layer>

Figure 10A:
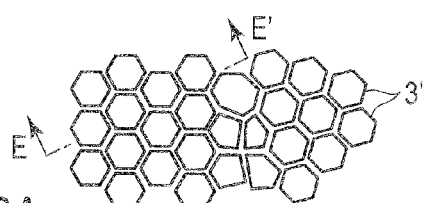
FIGS. 10A, 10B, and 10C are schematic views for explaining the processed shapes of the projections used in the embodiment.
Figure 10B:
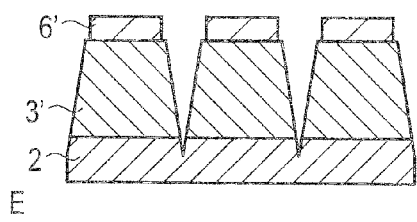
Figure 10C:
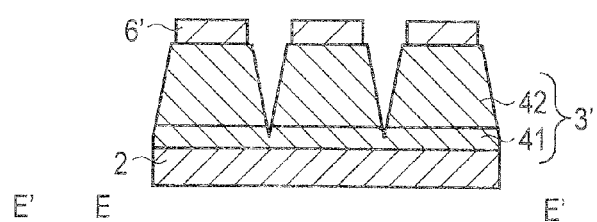

FIGS. 10A, 10B, and 10C are schematic views for explaining the processed shapes of the projections.

FIG. 10A is a view showing the projections from above.

FIG. 10B is a view showing an example of an E-E' sectional view of FIG. 10A.

FIG. 10C is a view showing another example of the E-E' sectional view of FIG. 10A.

When the sectional structures of the processed projections were checked, structures as shown in FIGS. 10A, 10B, and 10C were found. The grooves are V-shaped, and, when the recording layers 3' have a single-layered structure as shown in FIG. 10B, the recording layers 3' are completely separated, and the point of each groove enters the underlayer 2. In this state, the over-etch depth (the three-dimensional shape of the underlayer) can be 2 nm or less. Also, the distance between the separated recording layers 3' can be 1 nm or more in the lowermost portion, in order to prevent a magnetic correlation between the dots. If there is an etching depth distribution or recording layer thickness distribution in the medium, these values are the average values in the middle circumference of the medium.

When the recording layers 3' have a structure including two or more layers, the point of the groove changes in accordance with the magnetic design of the dots. For example, in an ECC structure in which a hard layer, coupling control layer, and soft layer are stacked in this order from below, the underlayer must also be divided as shown in FIG. 10B because it is necessary to break the exchange coupling between the dots. In a structure in which multiple recording layers are partially exchanged such as a capped structure including a stack of a cap layer 41 and upper recording layer 42 as shown in FIG. 10C, the division can be stopped midway along the cap layer so that the cap layer remains in the groove. It is also possible to form a capped structure by first forming the structure as shown in FIG. 10B, and then filling a filling material in only the grooves, and depositing a cap layer on the filling material.

<Formation of Projecting Patterns>

The projecting patterns used in the embodiment are formed by a self-organization method, lithography such as electron beam (EB) lithography, or duplication by a method such as imprinting.

Examples of the self-organization method are a method using a eutectic of an alloy, a method using a phase-separated structure of an organic material such as a block copolymer, a structure in which spherical or polygonal fine grains having the same grain size are arranged into a monolayer, and a method using mesoporous silica, porous alumina, and a eutectic structure such as Al—Si.

The block copolymer contains two or more types of polymers. In the embodiment, PS-PDMS is taken as an example. The block copolymer is, of course, not limited to PS-PDMS, and includes various types such as PS-PMMA and PS-PEO.

Examples of fine grains are $SiO_2$, Si, Au, and Ag. It is also possible to use oxide grains of, e.g., Fe, Zr, and Ti. Since many fine grains are spherical, the array has a hexagonal close-packed structure. For example, cubic grains are obtained by using fine Fe oxide grains, so the array is not a hexagon but a tetragon.

When using any of these self-organization materials, uniform patterns as shown in FIG. 2 can be formed at a pitch of a few nm to a few ten nm in a large area at once. When patterns like this can be formed by self-organization with a high size dispersion, the patterns can be applied to various uses such as an HDD. Also, when using EB lithography, desired patterns can be drawn on an electron-beam resist with a high accuracy.

Figure 11:
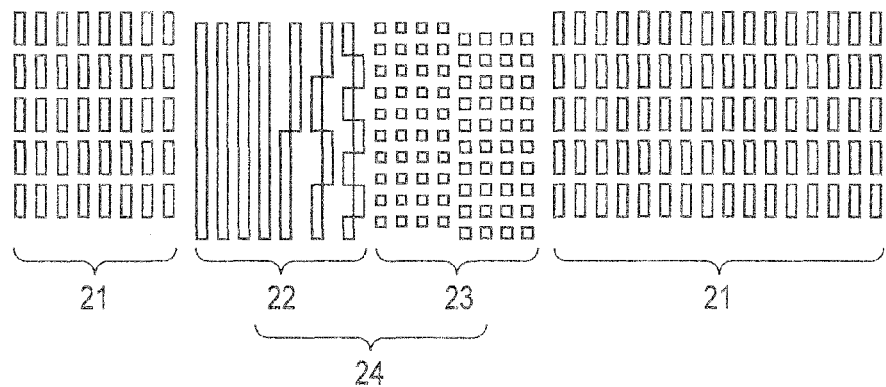
FIG. 11 is a front view showing examples of three-dimensional patterns for a bit patterned medium (BPM)

FIG. 11 is a front view showing examples of bit patterned medium (BPM) three-dimensional patterns formed by electron beam (EB) lithography.

As shown in FIG. 11, the examples of the EB lithography patterns are a bit pattern 21 formed in a data area, and servo area patterns 24 formed in a servo area and including a preamble address pattern 22 and bust pattern 23.

For an HDD, the patterns as shown in FIG. 11 are drawn.

Since the drawing rate of EB lithography is generally low, a general method is to use a master template made of Si or quartz, and duplicate patterns by a method such as imprinting. For an HDD, it is also possible to use a combined method of drawing only the servo patterns by EB lithography, and arranging a self-organization material on the patterns.

<Imprinting>

A mold and resist are used in imprinting. A substrate having a mask is coated with an imprint resist, and a mold is brought into contact with the resist. After the resist is cured, the mold is released. Although UV imprinting that cures a resist with light is recently generally used, it is also possible to use thermal imprinting such as a method that cures a resist with heat, or a method that softens a resist with heat, brings a mold into contact with the resist, and cures the resist by cooling. Various materials are used as a mold. For UV imprinting, quartz or a resin material that transmits light is used. For thermal imprinting, a material such as Si or Ni is used as a main material.

Imprinting is performed more easily when dots are formed as recesses than when they are formed as projections after imprinting. This tendency is particularly notable for micropatterns. Accordingly, the method according to this proposal is applicable even when it is necessary to invert the three-dimensional structure of imprint patterns.

<Liftoff Layer>

The liftoff layer can be made of Mg, V, Mn, Fe, Co, Ni, Zn, Ge, As, Mo, Sb, W, Re, Tl, or Pb, an alloy containing an element selected from this group, or a compound containing 50 at % or more of the component of the group.

If the ratio of other components exceeds 50 at %, the liftoff layer often becomes indissoluble in the removing solution. The liftoff layer can be Mo or W. It is also possible to use an organic film such as a resist. When using a resist, it is possible to use RIE of $O_2$ gas or $CF_4$ gas in processing, and an organic solvent such as acetone or PGMEA in removal.

<Hard Mask>

A hard mask layer can be formed on the magnetic recording layer as needed. The hard mask layer makes it possible to ensure the height of the mask, and prevent patterns from being tapered. Since the hard mask functions as a mask for subsequent recording layer processing, the material is changed in accordance with the process of recording layer processing. When using ion milling of, e.g., Ar, it is favorable to use C or Ta having a high hardness. It is also possible to use, e.g., an oxide or nitride of Ta, Ti, Al, Cr, Mo, or W. When using an reactive gas, e.g., when performing RIE of $Cl_2$ or methanol, a material such as Ru or Ta is favorable.

The hard mask is formed by depositing at least one film on the recording layer by sputtering or the like. When the hard mask requires a height to some extent, the hard mask can be given a structure including two or more layers. For example, as described in the examples, a mask having a high aspect can be formed by using C as the lower layer and Si as the upper layer. Alternatively, when using a metal such as Ta, Ti, Mo, or W or a compound of any of these metals as the lower layer, a material such as Ni or Cr can be used as the upper layer. The use of a metal material as the mask has the advantage that the deposition rate increases.

<Patterning of Hard Mask>

The hard mask can be patterned by using various dry etching processes as needed. For example, when using C as the first hard mask and Si as the second hard mask as described in the examples, the second hard mask can be processed by dry etching using a halogen gas ($CF_4$, $CF_4/O_2$, $CHF_3$, $SF_6$, or $Cl_2$). After that, the first hard mask can be processed by dry etching by using an oxygen-based gas such as $O_2$ or $O_3$, or a gas such as $H_2$ or $N_2$. It is favorable to use a Cl-based gas when using a Cr or Al compound as the hard mask, and use the same halogen gas as that for Si when using Ta, Ti, Mo, or W as the hard mask.

<Patterning of Magnetic Recording Layer>

The magnetic recording layer is patterned by etching unmasked portions by ion milling or RIE, thereby forming three-dimensional patterns on the recording layer. Three-dimensional patterns are normally formed by entirely etching the material of the recording layer. However, it is also possible, as needed, to form a structure in which the material of the recording layer is partially left behind in recesses, or a capped structure in which the first layer is entirely etched and layers from the second layer are left behind.

In ion milling, it is possible to use a rare gas such as Ne, Ar, Kr, or Xe, or an inert gas such as $N_2$.

In the embodiment, the recording layer processing conditions can be determined to some extent in order to form a predetermined shape.

Ion milling can be performed in a state in which the incident angle to the film surfaces is perpendicular (incident angle=90°) to 30° (incident angle=60°). For example, an incident angle of 45° is inadequate because the recording layer is tapered too much. In ion milling, however, it is effective to perform a method by which etching is initially performed at a large incident angle, and deposits on the sidewalls are finally removed at an incident angle of 20°. When the incident angle is small, the ion beam does not irradiate the bottoms of the three-dimensional patterns of the recording layer, so the structure of this proposal is not spoiled. Since, however, the taper θ of the recording layer changes, it is appropriate to design a large mask. The gas pressure of ion milling and the bean energy also affect the shape. If the gas pressure is too high, the straightness of the beam decreases, and side etching readily progresses. The gas pressure is appropriately about 0.01 to 3 Pa. Also, an excessively high beam energy causes damages or deteriorates the mask shape, and an excessively low beam energy decreases the etching rate. In the process used in the embodiment, a low energy of about 100 to 600 eV is appropriate.

When performing RIE, a gas such as a $Cl_2$-based gas, $CH_3OH$, or $NH_3+CO$ is used. After RIE, it is sometimes necessary to perform $H_2$ gas cleaning, baking, or water washing. In RIE, the taper and selectivity can be changed in accordance with the ratio of the antenna power to the bias power. When processing the recording layer, etching can be performed so that the shape is as close to perpendicular as possible. Therefore, it is appropriate to lower the energy and raise the bias power at a low pressure of about 1 to 0.05 Pa, thereby performing the process under the conditions of anisotropic etching.

<Removing Solution>

The removing solution is capable of dissolving the above-mentioned liftoff layer. Examples can be weak acids such as a hydrogen peroxide solution and formic acid. By contrast, hydrochloric acid is unfavorable because it forms pores in the surface. It is also possible to use, e.g., nitric acid, sulfuric acid, or phosphoric acid in a high-pH region. The pH can be 3 to 6.

After the magnetic recording layer is patterned, the medium is dipped in the removing solution and held in it for a few sec to a few min. After the liftoff layer and mask are sufficiently dissolved, the medium surface is washed with pure water, and the medium is transferred to a later step.

<Filling Step>

A process of performing planarization by filling can be added to the magnetic recording medium according to the embodiment. As this filling, sputtering using a filling material as a target is used because the method is simple. However, it is also possible to use, e.g., plating, ion beam deposition, CVD, or ALD. When using CVD or ALD, the filling material can be deposited at a high rate on the sidewalls of the highly tapered magnetic recording layer. Also, high-aspect patterns can be filled without any gap by applying a bias to the substrate during filling deposition. It is also possible to use a method by which a so-called resist such as SOG (Spin-On-Glass) or SOC (Spin-On-Carbon) is formed by spin coating and cured by annealing.

$SiO_2$ can be used as the filling material. However, the filling material is not limited to this, and can be any material as long as the hardness and flatness are allowable. For example, an amorphous metal such as NiTa or NiNbTi can be selected as the filling material because the amorphous metal is easy to planarize. A material (e.g., $CN_x$ or $CH_x$) mainly containing C can also be selected because the material has high hardness and high adhesion to diamond-like carbon (DLC). An oxide or nitride such as $SiO_2$, $SiN_x$, $TiO_x$, or $TaO_x$ is also favorable as the filling material. However, if the filling material forms a reaction product together with the magnetic recording layer when brought into contact with the magnetic recording layer, a protective layer can be sandwiched between the filling layer and magnetic recording layer.

<Protective Film Formation and Post-Process>

The carbon protective film is desirably deposited by CVD in order to improve the coverage for the three-dimensional structure. However, the protective film can also be deposited by sputtering or vacuum deposition. A DLC film containing a large amount of $sp^3$-bonded carbon is formed by CVD. If the film thickness is 2 nm or less, the coverage worsens. If the film thickness is 10 nm or more, the magnetic spacing between a recording/reproduction head and the medium increases, and the SNR decreases. The protective film can be coated with a lubricant. As the lubricant, it is possible to use, e.g., perfluoropolyether, alcohol fluoride, or fluorinated carboxylic acid.

<Substrate>

Although the substrate shape is not limited at all, the substrate is normally circular and made of a hard material. Examples are a glass substrate, metal-containing substrate, carbon substrate, and ceramics substrate. Projecting patterns on the substrate surface are desirably small in order to improve the pattern in-plane uniformity. It is also possible to form a protective film such as an oxide film on the substrate surface as needed.

As the glass substrate, it is possible to use amorphous glass such as soda lime glass or aluminosilicate glass, or crystallized glass such as lithium-based glass. As the ceramics glass, it is possible to use a sintered substrate mainly containing alumina, aluminum nitride, or silicon nitride.

<Magnetic Recording Layer>

When using alloy-based materials, the magnetic recording layer can contain Co, Fe, or Ni as a main component, and additionally contains Pt or Pd. The magnetic recording layer can also contain Cr or an oxide as needed. As the oxide, silicon oxide or titanium oxide is particularly favorable. In addition to the oxide, the magnetic recording layer can further contain one or more elements selected from Ru, Mn, B, Ta, Cu, and Pd. These elements can improve the crystallinity and orientation, and make it possible to obtain recording/reproduction characteristics and thermal fluctuation characteristics more suitable for high-density recording.

As the perpendicular magnetic recording layer, it is possible to use a CoPt-based alloy, an FePt-based alloy, a CoCrPt-based alloy, an FePtCr-based alloy, CoPtO, FePtO, CoPtCrO, FePtCrO, CoPtSi, FePtSi, and a multilayered structure including Co, Fe, or Ni and an alloy mainly containing at least one element selected from the group consisting of Pt, Pd, Ag, and Cu. It is also possible to use an MnAl alloy, SmCo alloy, FeNbB alloy, or CrPt alloy having a high Ku.

The thickness of the perpendicular magnetic recording layer can be 3 to 30 nm, and further more, 5 to 15 nm. When the thickness falls within this range, it is possible to manufacture a magnetic recording/reproduction apparatus more suitable for a high recording density. If the thickness of the perpendicular magnetic recording layer is less than 3 nm, the reproduced output is too low, and the noise component becomes higher. If the thickness of the perpendicular magnetic recording layer exceeds 30 nm, the reproduced output becomes too high and distorts the waveform.

<Interlayer>

An interlayer made of a nonmagnetic material can be formed between a soft magnetic underlayer and the recording layer. The interlayer has two functions, i.e., interrupts the exchange coupling interaction between the soft magnetic underlayer and recording layer, and controls the crystallinity of the recording layer. As the material of the interlayer, it is possible to use Ru, Pt, Pd, W, Ti, Ta, Cr, Si, Ni, Mg, an alloy containing any of these elements, or an oxide or nitride of any of these elements.

<Soft Magnetic Underlayer>

A soft magnetic underlayer (SUL) horizontally passes a recording magnetic field from a single-pole head for magnetizing the perpendicular magnetic recording layer, and returns the magnetic field toward the magnetic head, i.e., performs a part of the function of the magnetic head. The soft magnetic underlayer has a function of applying a steep sufficient perpendicular magnetic field to the recording layer, thereby increasing the recording/reproduction efficiency. A material containing Fe, Ni, or Co can be used as the soft magnetic underlayer. Examples of the material are FeCo-based alloys such as FeCo and FeCoV, FeNi-based alloys such as FeNi, FeNiMo, FeNiCr, and FeNiSi, FeAl-based and FeSi-based alloys such as FeAl, FeAlSi, FeAlSiCr, FeAlSiTiRu, and FeAlO, FeTa-based alloys such as FeTa, FeTaC, and FeTaN, and FeZr-based alloys such as FeZrN. It is also possible to use a material having a microcrystalline structure or a granular structure in which fine crystal grains are dispersed in a matrix. Examples are FeAlO, FeMgO, FeTaN, and FeZrN containing 60 at % or more of Fe. Other examples of the material of the soft magnetic underlayer are Co alloys containing Co and at least one of Zr, Hf, Nb, Ta, Ti, and Y. The Co alloy can contain 80 at % or more of Co. When the Co alloy like this is deposited by sputtering, an amorphous layer readily forms. The amorphous soft magnetic material has none of magnetocrystalline anisotropy, a crystal defect, and a grain boundary, and hence has very high soft magnetism and can reduce the noise of the medium. Examples of the amorphous soft magnetic material are CoZr-, CoZrNb-, and CoZrTa-based alloys.

It is also possible to additionally form a base layer below the soft magnetic underlayer, in order to improve the crystallinity of the soft magnetic underlayer or improve the adhesion to the substrate. As the material of this base layer, it is possible to use Ti, Ta, W, Cr, Pt, an alloy containing any of these elements, or an oxide or nitride of any of these elements.

Furthermore, in order to prevent spike noise, it is possible to divide the soft magnetic underlayer into a plurality of layers, and insert 0.5- to 1.5-nm thick Ru, thereby causing antiferromagnetic coupling. The soft magnetic layer may also be exchange-coupled with a hard magnetic film having in-plane anisotropy such as CoCrPt, SmCo, or FePt, or a pinned layer made of an antiferromagnetic material such as IrMn or PtMn. To control the exchange coupling force, it is possible to stack magnetic films (e.g., Co) or nonmagnetic films (e.g., Pt) on the upper and lower surfaces of the Ru layer.

Figure 12:
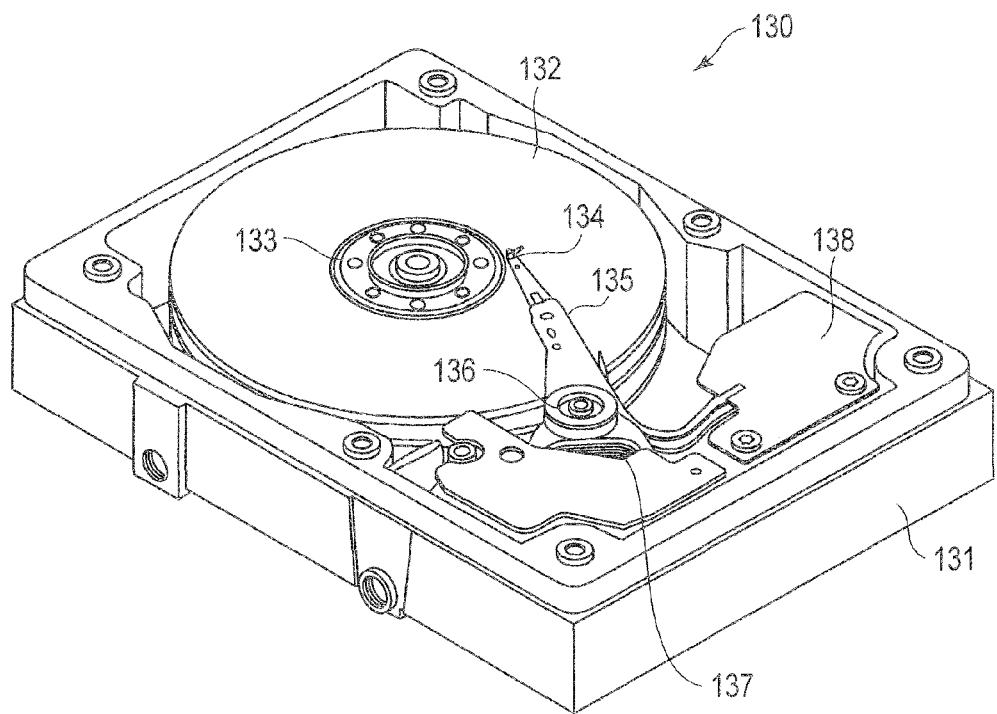
FIG. 12 is a partially exploded perspective view showing an example of a magnetic recording/reproduction apparatus to which the magnetic recording medium according to the embodiment is applicable.

FIG. 12 is a partially exploded perspective view showing an example of a magnetic recording/reproduction apparatus to which the magnetic recording medium according to the embodiment is applicable.

As shown in FIG. 12, a magnetic recording/reproduction apparatus 130 includes a rectangular boxy housing 131 having an open upper end, and a top cover (not shown) that is screwed to the housing 131 by a plurality of screws and closes the upper-end opening of the housing.

The housing 131 houses, e.g., a magnetic recording medium 132 according to the embodiment, a spindle motor 133 as a driving means for supporting and rotating the magnetic recording medium 132, a magnetic head 134 for recording and reproducing magnetic signals with respect to the magnetic recording medium 132, a head actuator 135 that has a suspension on the distal end of which the magnetic head 134 is mounted, and supports the magnetic head 134 such that it can freely move with respect to the magnetic recording medium 132, a rotating shaft 136 for rotatably supporting the head actuator 135, a voice coil motor 137 for rotating and positioning the head actuator 135 via the rotating shaft 136, and a head amplifier circuit board 138.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic recording medium manufacturing method comprising:
    forming a magnetic recording layer on a substrate;
    forming a mask layer on the magnetic recording layer;
    forming projecting patterns on the mask layer;
    transferring the projecting patterns to the mask layer;
    etching the magnetic recording layer through the mask layer having the projecting patterns; and
    removing the mask layer,
    the etching performed under a condition which meets an expression (1) below to form the magnetic recording layer including a plurality of projections having a shape combining a circular truncated conical shape as a vertex region, and a truncated polygonal conical shape as a bottom region:

$$X > Z - 2Y/\tan\theta \tag{1}$$

wherein X (nm) is a diameter of the projecting patterns of the mask layer, Y (nm) is an etching depth of the magnetic recording layer, Z (nm) is a dot pitch of the projecting patterns of the mask layer, and $\theta$ is a taper angle of a side surface of the projection with respect to a bottom surface thereof.

2. The method according to claim 1, wherein the forming the projecting patterns on the mask layer is performed by forming a self-organization film on the mask layer, causing micro phase separation in the self-organization film, leaving a dot-shaped phase behind, and removing the other phase.

* * * * *